United States Patent
Yang

(10) Patent No.: US 11,428,905 B2
(45) Date of Patent: Aug. 30, 2022

(54) CAMERA OPTICAL LENS

(71) Applicant: AAC Optics Solutions Pte. Ltd., Singapore (SG)

(72) Inventor: Yongqiang Yang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 351 days.

(21) Appl. No.: 16/854,930

(22) Filed: Apr. 22, 2020

(65) Prior Publication Data
US 2021/0263275 A1 Aug. 26, 2021

(30) Foreign Application Priority Data
Feb. 25, 2020 (CN) .......................... 202010116900.8

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC ................ G02B 13/0045; G02B 13/00; G02B 13/0015; G02B 13/002; G02B 9/64; G02B 9/00
USPC ....................................................... 359/708
See application file for complete search history.

(56) References Cited

U.S. PATENT DOCUMENTS

| | | | | |
|---|---|---|---|---|
| 10,394,002 | B2 * | 8/2019 | Huang | G02B 9/64 |
| 11,169,360 | B2 * | 11/2021 | Zhang | G02B 9/64 |
| 11,181,719 | B2 * | 11/2021 | Kim | G02B 13/0045 |
| 2015/0316751 | A1 * | 11/2015 | Sekine | G02B 27/0025 359/755 |
| 2015/0378131 | A1 * | 12/2015 | Tang | G02B 9/64 359/708 |
| 2016/0033742 | A1 * | 2/2016 | Huang | G02B 13/0015 359/708 |
| 2018/0003926 | A1 * | 1/2018 | Huang | G02B 9/00 |
| 2019/0049701 | A1 * | 2/2019 | Chen | G02B 13/18 |
| 2019/0187414 | A1 * | 6/2019 | Zhang | G02B 9/34 |
| 2019/0285863 | A1 * | 9/2019 | Yang | G02B 27/0025 |
| 2019/0369365 | A1 * | 12/2019 | Kim | G02B 13/0045 |
| 2019/0369368 | A1 * | 12/2019 | Jung | G02B 7/021 |

* cited by examiner

*Primary Examiner* — William R Alexander
(74) *Attorney, Agent, or Firm* — W&G Law Group

(57) ABSTRACT

The present disclosure relates to the technical field of optical lens and discloses a camera optical lens. The camera optical lens includes, from an object side to an image side: a first lens having a positive refractive power, a second lens having a negative refractive power, a third lens having a positive refractive power, a fourth lens, a fifth lens having a positive refractive power, a sixth lens having a positive refractive power, and a seventh lens having a negative refractive power. The camera optical lens satisfies following conditions: $1.70 > f6/f \leq 5.00$; $-4.00 \leq R14/R13 \leq -1.00$; $-5.00 \leq f2/f \leq -2.00$; $1.00 \leq d8/d9 \leq 2.00$. The camera optical lens can achieve excellent optical characteristics with a large aperture, wide-angle, and being ultra-thin.

10 Claims, 8 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens, even five-piece or six-piece lens structure. However, with the development of technology and the increase of the diverse demands of users, and as the pixel area of photosensitive devices is becoming smaller and smaller and the requirement of the system on the imaging quality is improving constantly, the seven-piece lens structure gradually appear in lens designs. Although normal seven-piece lens structure already has good optical characteristics, lens distance and lens shape thereof are still improper, which make the seven-piece lens structure unable of satisfying the design requirement of large aperture, wide-angle, and being ultra-thin.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
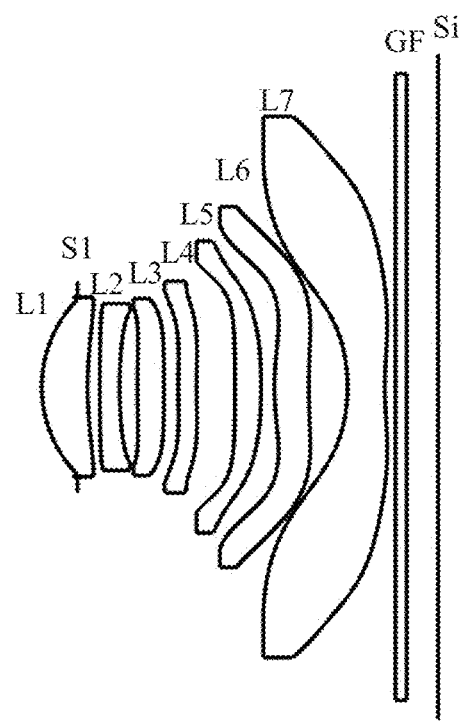
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, the camera optical lens 10 includes seven lenses. Specifically, the camera optical lens 10 includes, from an object side to an image side: an aperture S1, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power and a seventh lens L7 having a negative refractive power. An optical element such as an optical filter GF can be arranged between the seventh lens L7 and an image surface Si.

The first lens L1 the second lens L2, the third lens L3, the fourth lens L4, the fifth lens L5, the sixth lens L6 and the seventh lens L7 are made of plastic material.

A focal length of the camera optical lens is defined as f, a focal length of the second lens L2 is defined as f2, and the camera optical lens 10 should satisfy a condition of $-5.00 \leq f2/f \leq -2.00$, which effectively distributes a refractive power of the second lens L2, and correct the aberration of the optical system, thereby improving imaging quality. Preferably, the camera optical lens 10 further satisfies a condition of −4.90≤f2/f>−2.05.

A focal length of the camera optical lens is defined as f, a focal length of the sixth lens L6 is defined as f6, and the camera optical lens 10 should satisfy a condition of 1.70≤f2/f≤5.00, which fixes a ratio of the focal length of the sixth lens L6 and the focal length of the camera optical lens. Within this range, it is helpful for improving optical system performance thereof. Preferably, the camera optical lens 10 further satisfies a condition of 1.75≤f2/f≤4.97.

A curvature radius of the object-side surface of the seventh lens L7 is defined as R13, a curvature radius of the image-side surface of the seventh lens L7 is defined as R14, and the camera optical lens 10 should satisfy a condition of −4.00<R14/R13<−1.00, which fixes a ratio of the curvature radius of the image-side surface of the seventh lens L7 and the curvature radius of the object-side surface of the seventh lens L7. Within this range, it is helpful for balancing aberration and improving imaging quality. Preferably, the camera optical lens 10 further satisfies a condition of −2.48≤R14/R13≤−0.63.

An on-axis distance from the image-side surface of the fourth lens L4 to the object-side surface of the fifth lens L5 is defined as d8, an on-axis thickness of the fifth lens L5 is defined as d9, and the camera optical lens 10 should satisfy a condition of 1.00≤d8/d9≤2.00. When satisfying this condition, it is helpful for lens processing and assembly. Preferably, the camera optical lens 10 further satisfies a condition of 1.05≤d8/d9≤1.90.

An on-axis distance from the image-side surface of the sixth lens L6 to the object-side surface of the seventh lens L7 is defined as d12, an on-axis thickness of the seventh lens L7 is defined as d13, and the camera optical lens 10 should satisfy a condition of 1.00≤d12/d13≤2.00. When satisfying this condition, it is helpful for correcting field curvature and improving image quality. Preferably, the camera optical lens 10 further satisfies a condition of 1.02≤d12/d13≤1.90.

In an embodiment, the object-side surface of the first lens L1 is convex in a paraxial region, the image-side surface of the first lens L1 is concave in the paraxial region.

A focal length of the camera optical lens is defined as f, a focal length of the first lens L1 is defined as f1, and the camera optical lens 10 should satisfy a condition of 0.45≤f1/f≤1.53, which fixes a ratio of the focal length of the first lens L1 and the focal length of the camera optical lens. Within this range, the first lens L1 has a proper positive refractive power, thereby facilitating reducing aberration and helpful for a development towards ultra-thin and large aperture. Preferably, the camera optical lens 10 further satisfies a condition of 0.73≤f1/f≤1.22.

A curvature radius of an object-side surface of the first lens L1 is defined as R1, a curvature radius of an image-side surface of the first lens L1 is defined as R2, and the camera optical lens 10 further satisfies a condition of −4.73≤(R1+R2)/(R1−R2)≤−1.27. This can reasonably control a shape of the first lens L1 in such a manner that the first lens L1 can effectively correct a spherical aberration of the camera optical lens. Preferably, the camera optical lens 10 further satisfies a condition of −2.96≤(R1+R2)/(R1−R2)≤−1.59.

An on-axis thickness of the first lens L1 is defined as d1, a total optical length from the object side surface of the first lens L1 to the image surface Si of the camera optical lens along an optical axis is defined as TTL, and the camera optical lens 10 further satisfies a condition of 0.06≤d1/TTL≤0.18. Within this range, it can facilitate achieving ultra-thin lenses. Preferably, the camera optical lens 10 further satisfies a condition of 0.09≤d1/TTL≤0.14.

In an embodiment, an object-side surface of the second lens L2 is convex in the proximal region, and an image-side surface of the second lens L2 is concave in the proximal region.

A curvature radius of the object-side surface of the second lens L2 is defined as R3, a curvature radius of the image-side surface of the second lens L2 is defined as R4, and the camera optical lens 10 further satisfies a condition of 0.57≤(R3+R4)/(R3−R4)≤6.56, which specifies a shape of the second lens L2. Within this range, a development towards ultra-thin and wide-angle lenses would facilitate correcting the problem of an axis aberration. Preferably, the camera optical lens 10 further satisfies a condition of 0.91≤(R3+R4)/(R3−R4)≤5.25.

An on-axis thickness of the second lens L2 is defines as d3, and the camera optical lens 10 further satisfies a condition of 0.02≤d3/TTL≤0.08. This can facilitate achieving ultra-thin lenses. Preferably, the camera optical lens 10 further satisfies a condition of 0.03≤d3/TTL≤0.06.

In an embodiment, an object-side surface of the third lens L3 is convex in the proximal region, and an image-side surface of the third lens L3 is convex in the proximal region.

A focal length of the third lens L3 is defined as f3, and the camera optical lens 10 further satisfies a condition of 2.89≤f3/f≤11.21. An appropriate distribution of the positive refractive power leads to a better imaging quality and a lower sensitivity. Preferably, the camera optical lens 10 further satisfies a condition of 4.62≤f3/f≤8.97.

A curvature radius of the object-side surface of the third lens L3 is defined as R5, a curvature radius of the image-side surface of the third lens L3 is defined as R6, and the camera optical lens 10 further satisfies a condition of −5.26≤(R5+R6)/(R5−R6)≤0.33. This specifies a shape of the third lens L3, thereby facilitating shaping of the third lens. Within this range, it can decrease deflection of light which passing through the lens, and effectively reduces aberration. Preferably, the camera optical lens 10 further satisfies a condition of −3.29≤(R5+R6)/(R5−R6)≤0.26.

An on-axis thickness of the third lens L3 is defined as d5, and the camera optical lens 10 further satisfies a condition of 0.03≤d5/TTL≤0.12. This can facilitate achieving ultra-thin lenses. Preferably, the camera optical lens 10 further satisfies a condition of 0.05≤d5/TTL≤0.09.

In an embodiment, an object-side surface of the fourth lens L4 is convex in the proximal region, and an image-side surface of the fourth lens L4 is concave in the proximal region.

A focal length of the fourth lens L4 is defined as f4, and the camera optical lens 10 further satisfies a condition of $-118.23 \leq f4/f \leq 36.26$, which fixes a ration of the focal length of the fourth lens L4 and the focal length of the camera optical lens 10, and facilitate improving optical performance. Preferably, the camera optical lens 10 further satisfies a condition of $-73.89 \leq f4/f \leq 29.00$.

A curvature radius of the object-side surface of the fourth lens L4 is defined as R7, a curvature radius of the image-side surface of the fourth lens L4 is defined as R8, and the camera optical lens 10 further satisfies a condition of $-36.06 \leq (R7+R8)/(R7-R8) \leq 43.89$, which specifies a shape of the fourth lens L4. Within this range, a development towards ultra-thin and wide-angle lens would easily correcting a problem like an off-axis aberration. Preferably, the camera optical lens 10 further satisfies a condition of $-22.54 \leq (R7+R8)/(R7-R8) \leq 35.11$.

An on-axis thickness of the fourth lens L4 is defined as d7, and the camera optical lens 10 further satisfies a condition of $0.02 \leq d7/TTL \leq 0.07$, which can facilitate achieving ultra-thin lenses. Preferably, the camera optical lens 10 further satisfies a condition of $0.03 \leq d7/TTL \leq 0.06$.

In an embodiment, an object-side surface of the fifth lens L5 is concave in the proximal region, and an image-side surface of the fifth lens L5 is convex in the proximal region.

A focal length of the fifth lens L5 is defined as f5, and the camera optical lens 10 further satisfies a condition of $0.82 \leq f5/f \leq 6.18$, which can effectively make a light angle of the camera lens gentle and reduce a tolerance sensitivity. Preferably, the camera optical lens 10 further satisfies a condition of $1.31 \leq f5/f \leq 4.94$.

A curvature radius of the object-side surface of the fifth lens L5 is defined as R9, a curvature radius of the image-side surface of the fifth lens L5 is defined as R10, and the camera optical lens 10 further satisfies a condition of $0.61 \leq (R9+R10)/(R9-R10) \leq 2.81$, which specifies a shape of the fifth lens L5. Within this range, a development towards ultra-thin and wide-angle lenses can facilitate correcting a problem of the off-axis aberration. Preferably, the camera optical lens 10 further satisfies a condition of $0.98 \leq (R9+R10)/(R9-R10) \leq 2.24$.

An on-axis thickness of the fifth lens L5 is defined as d9, and the camera optical lens 10 further satisfies a condition of $0.03 \leq d9/TTL \leq 0.13$. This can facilitate achieving ultra-thin lenses. Preferably, the camera optical lens 10 further satisfies a condition of $0.04 \leq d9/TTL \leq 0.11$.

In an embodiment, an object-side surface of the sixth lens L6 is convex in the proximal region, and an image-side surface of the sixth lens L6 is concave in the proximal region A curvature radius of the object-side surface of the sixth lens L6 is defined as R11, a curvature radius of the image-side surface of the sixth lens L6 is defined as R12, and the camera optical lens 10 further satisfies a condition of $-11.68 \leq (R11+R12)/(R11-R12) \leq -1.04$, which specifies a shape of the sixth lens L6. Within this range, a development towards ultra-thin and wide-angle lenses would facilitate correcting a problem like aberration of the off-axis aberration. Preferably, the camera optical lens 10 further satisfies a condition of $-7.30 \leq (R11+R12)/(R11-R12) \leq -1.30$.

An on-axis thickness of the sixth lens L6 is defined as d11, and the camera optical lens 10 further satisfies a condition of $0.02 \leq d11/TTL \leq 0.13$. This can facilitate achieving ultra-thin lenses. Preferably, the camera optical lens 10 further satisfies a condition of $0.03 \leq d11/TTL \leq 0.10$.

In an embodiment, an object-side surface of the seventh lens L7 is concave in the proximal region, and an image-side surface of the seventh lens L7 is concave in the proximal region.

A focal length of the seventh lens L7 is defined as f7, and the camera optical lens 10 further satisfies a condition of $-1.45 \leq f7/f \leq -0.41$. The appropriate distribution of negative refractive power makes it possible that the system has the better imaging quality and lower sensitivity. Preferably, the camera optical lens 10 further satisfies a condition of $-0.91 \leq f7/f \leq -0.52$.

A curvature radius of the object-side surface of the seventh lens L7 is defined as R13, a curvature radius of the image-side surface of the seventh lens L7 is defined as R 14, and the camera optical lens 10 further satisfies a condition of $-1.18 \leq (R13+R14)/(R13-R14) \leq -0.02$, which specifies a shape of the sixth lens L7. Within this range, a development towards ultra-thin and wide-angle lenses would facilitate correcting a problem like aberration of the off-axis aberration. Preferably, the camera optical lens 10 further satisfies a condition of $-0.74 \leq (R13+R14)/(R13-R14) \leq -0.02$.

An on-axis thickness of the seventh lens L7 is defined as d13, and the camera optical lens 10 further satisfies a condition of $0.04 \leq d13/TTL \leq 0.15$. This can facilitate achieving ultra-thin lenses. Preferably, the camera optical lens 10 further satisfies a condition of $0.06 \leq d13/TTL \leq 0.12$.

In an embodiment, an F number of the camera optical lens 10 is less than or equal to 1.96. The camera optical lens 10 has a better imaging performance and large aperture.

In an embodiment, a FOV (field of view) of the camera optical lens 10 is greater than or equal to 85.8°, thereby achieving wide-angle.

In an embodiment, a combined focal length of the first lens L1 and of the second lens L2 is defined as f12, and the camera optical lens 10 further satisfies a condition of $0.60 \leq f12/f \leq 2.06$. This can eliminate the aberration and distortion of the camera optical lens and reduce a back focal length of the camera optical lens, thereby maintaining miniaturization of the camera optical lens. Preferably, the camera optical lens 10 further satisfies a condition of $0.97 \leq f12/f \leq 1.65$.

When the focal length of the camera optical lens 10, the focal length and curvature radius of each lens satisfy above conditions, the camera optical lens 10 has excellent optical performance, whist satisfying design requirement for large aperture, wide-angle and ultra-thin. According to characteristic thereof, the camera optical lens 10 is especially suitable for mobile cameral lens assembly and WEB camera, which is constitute of CCD, CMOS and other camera elements with high pixels.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image surface of the camera optical lens along the optical axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|     | R        | d      |     | nd     |     | vd    |
| --- | -------- | ------ | --- | ------ | --- | ----- |
| S1  | ∞        | d0=    | −0.676 |    |     |       |
| R1  | 2.380    | d1=    | 0.865 | nd1 | 1.5444 | v 1 | 55.82 |
| R2  | 7.117    | d2=    | 0.230 |    |     |       |
| R3  | 21.176   | d3=    | 0.373 | nd2 | 1.6700 | v 2 | 19.39 |
| R4  | 7.979    | d4=    | 0.340 |    |     |       |
| R5  | 21.528   | d5=    | 0.497 | nd3 | 1.5346 | v 3 | 55.69 |
| R6  | −392.623 | d6=    | 0.272 |    |     |       |
| R7  | 15.962   | d7=    | 0.346 | nd4 | 1.6610 | v 4 | 20.53 |
| R8  | 14.907   | d8=    | 0.725 |    |     |       |
| R9  | −48.783  | d9=    | 0.491 | nd5 | 1.5346 | v 5 | 55.69 |
| R10 | −11.244  | d10=   | 0.255 |    |     |       |
| R11 | 5.325    | d11=   | 0.650 | nd6 | 1.5661 | v 6 | 37.71 |
| R12 | 24.164   | d12=   | 0.728 |    |     |       |
| R13 | −3.353   | d13=   | 0.706 | nd7 | 1.5444 | v 7 | 55.82 |
| R14 | 7.097    | d14=   | 0.200 |    |     |       |

TABLE 1-continued

|     | R  | d    |       | nd     |     | vd    |
| --- | -- | ---- | ----- | ------ | --- | ----- |
| R15 | ∞  | d15= | 0.210 | ndg    | 1.5168 | v g | 64.17 |
| R16 | ∞  | d16= | 0.593 |        |     |       |

In the table, meanings of various symbols will be described as follows.
S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the sixth lens L6;
R12: curvature radius of the image-side surface of the sixth lens L6;
R13: curvature radius of the object-side surface of the seventh lens L7;
R14: curvature radius of the image-side surface of the seventh lens L7;
R15: curvature radius of an object-side surface of the optical filter GF;
R16: curvature radius of an image-side surface of the optical filter GF;
d: on-axis thickness of a lens and an on-axis distance between lens;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the optical filter GF;
d15: on-axis thickness of the optical filter GF;
d16: on-axis distance from the image-side surface to the image surface of the optical filter GF;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
ndg: refractive index of the d line of the optical filter GF;
vd: abbe number;
v 1: abbe number of the first lens L1;
v 2: abbe number of the second lens L2;
v 3: abbe number of the third lens L3;
v 4: abbe number of the fourth lens L4;
v 5: abbe number of the fifth lens L5;
v 6: abbe number of the sixth lens L6;
v 7: abbe number of the seventh lens L7;
v g: abbe number of the optical filter GF.

Table 2 shows aspherical surface data of the camera optical lens 10 in Embodiment 1 of the present disclosure.

TABLE 2

|    | Conic coefficient | Aspheric surface coefficients | | | |
| -- | ----------------- | ---------- | ---------- | ---------- | ---------- |
|    | k                 | A4         | A6         | A8         | A10        |
| R1 | −9.1126E−02       | 1.5979E−03 | 1.3054E−04 | 2.0006E−03 | −3.9015E−03 |
| R2 | −1.7912E+01       | −2.7388E−03 | −2.3430E−03 | 3.7188E−03 | −4.7654E−03 |
| R3 | −9.0373E+01       | −1.5923E−02 | 4.9239E−03 | 2.9017E−03 | −1.9753E−03 |
| R4 | 1.2085E+00        | −6.9431E−03 | 1.2788E−02 | −1.5560E−02 | 3.2236E−02 |
| R5 | −6.2250E+01       | −1.1612E−02 | −1.4153E−03 | 1.6822E−03 | −1.1538E−02 |

TABLE 2-continued

| | | | | | |
|---|---|---|---|---|---|
| R6 | 3.5989E+01 | −2.1889E−02 | 4.5590E−03 | −1.9263E−03 | −7.6414E−03 |
| R7 | −1.3718E+01 | −5.4110E−02 | 2.0698E−02 | −2.3721E−02 | 2.0936E−02 |
| R8 | −5.5231E+00 | −4.6195E−02 | 1.4078E−02 | −1.2279E−02 | 8.2921E−03 |
| R9 | 2.9277E+01 | −7.3796E−03 | 4.5575E−03 | −1.1241E−02 | 1.0296E−02 |
| R10 | −6.8105E+01 | −2.5937E−02 | −4.1407E−03 | 3.1229E−03 | 1.7020E−03 |
| R11 | −1.6816E+01 | 4.4384E−03 | −2.9032E−02 | 1.0871E−02 | −1.0594E−03 |
| R12 | 2.0627E+01 | 2.7636E−02 | −3.3075E−02 | 1.1155E−02 | −1.9916E−03 |
| R13 | −5.9557E−01 | −1.3900E−02 | −3.7918E−03 | 2.5830E−03 | −4.7826E−04 |
| R14 | 8.5496E−03 | −3.6493E−02 | 6.6600E−03 | −7.4998E−04 | 5.1869E−05 |

| | Aspheric surface coefficients | | | | |
|---|---|---|---|---|---|
| | A12 | A14 | A16 | A18 | A20 |
| R1 | 4.0569E−03 | −2.4363E−03 | 8.3818E−04 | −1.5364E−04 | 1.1141E−05 |
| R2 | 3.7002E−03 | −1.7971E−03 | 5.1402E−04 | −7.9705E−05 | 5.0770E−06 |
| R3 | 3.9664E−04 | 2.1798E−04 | −1.5540E−04 | 3.9859E−05 | −3.4654E−06 |
| R4 | −3.7360E−02 | 2.6055E−02 | −1.0719E−02 | 2.3995E−03 | −2.2031E−04 |
| R5 | 1.6096E−02 | −1.2370E−02 | 5.4208E−03 | −1.2805E−03 | 1.2677E−04 |
| R6 | 9.0963E−03 | −5.3248E−03 | 1.6885E−03 | −2.5346E−04 | 1.1140E−05 |
| R7 | −1.2040E−02 | 3.6918E−03 | −3.5310E−04 | −5.7963E−05 | 1.0241E−05 |
| R8 | −3.4449E−03 | 7.0446E−04 | 1.1885E−05 | −2.6560E−05 | 2.7729E−06 |
| R9 | −5.4844E−03 | 1.6837E−03 | −3.0078E−04 | 2.9369E−05 | −1.2100E−06 |
| R10 | −1.7750E−03 | 5.6111E−04 | −8.5221E−05 | 6.3832E−06 | −1.8992E−07 |
| R11 | −4.4614E−04 | 1.5566E−04 | −2.0394E−05 | 1.2562E−06 | −3.0311E−08 |
| R12 | 1.5802E−04 | 3.6015E−06 | −1.6457E−06 | 1.1306E−07 | −2.5979E−09 |
| R13 | 4.7206E−05 | −2.7926E−06 | 9.9702E−08 | −1.9903E−09 | 1.7126E−11 |
| R14 | −2.0838E−06 | 2.8492E−08 | 1.2544E−09 | −5.8198E−11 | 7.0171E−13 |

Here, K is a conic coefficient, and A4, A6, A8, A10, A12, A14, A16, A18 and A20 are aspheric surface coefficients.
IH: Image height $$y=(x^2/R)/[1+\{1-(k+1)(x^2R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first lens L1 P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6; P7R1 and P7R2 represent the object-side surface and the image-side surface of the seventh lens L7. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 1.615 | | |
| P1R2 | 1 | 1.105 | | |
| P2R1 | 2 | 0.575 | 0.825 | |

TABLE 3-continued

| | Number(s) of inflexion points | Inflexion point position 1 | Inflexion point position 2 | Inflexion point position 3 |
|---|---|---|---|---|
| P2R2 | 0 | | | |
| P3R1 | 1 | 0.535 | | |
| P3R2 | 0 | | | |
| P4R1 | 3 | 0.325 | 1.565 | 1.655 |
| P4R2 | 2 | 0.365 | 1.595 | |
| P5R1 | 1 | 2.155 | | |
| P5R2 | 2 | 2.115 | 2.665 | |
| P6R1 | 3 | 0.725 | 2.425 | 3.055 |
| P6R2 | 2 | 0.775 | 3.115 | |
| P7R1 | 1 | 1.985 | | |
| P7R2 | 3 | 0.625 | 4.395 | 4.565 |

TABLE 4

| | Number(s) of arrest points | Arrest point position 1 |
|---|---|---|
| P1R1 | 0 | |
| P1R2 | 1 | 1.585 |
| P2R1 | 0 | |
| P2R2 | 0 | |
| P3R1 | 1 | 0.855 |
| P3R2 | 0 | |
| P4R1 | 1 | 0.575 |
| P4R2 | 1 | 0.645 |
| P5R1 | 0 | |
| P5R2 | 0 | |
| P6R1 | 1 | 1.205 |
| P6R2 | 1 | 1.125 |
| P7R1 | 0 | |
| P7R2 | 1 | 1.195 |

Figure 2:
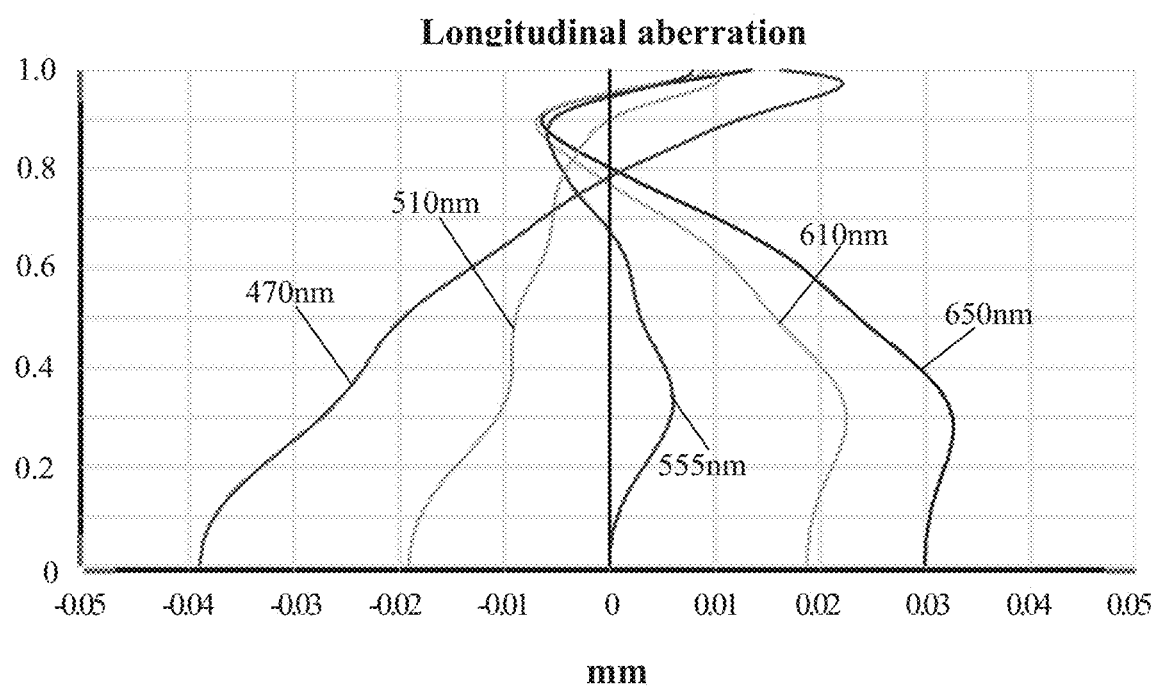
FIG. 2 is a schematic diagram of a longitudinal aberration of the camera optical lens shown in FIG. 1.
Figure 3:
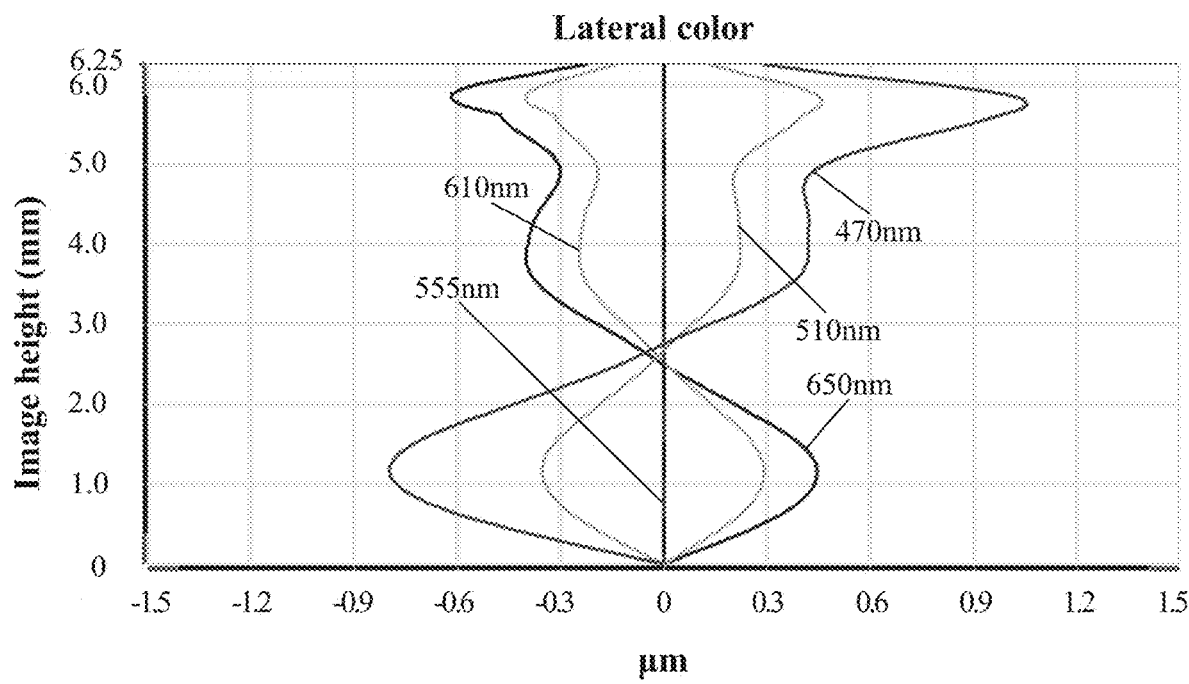
FIG. 3 is a schematic diagram of a lateral color of the camera optical lens shown in FIG. 1.
Figure 4:
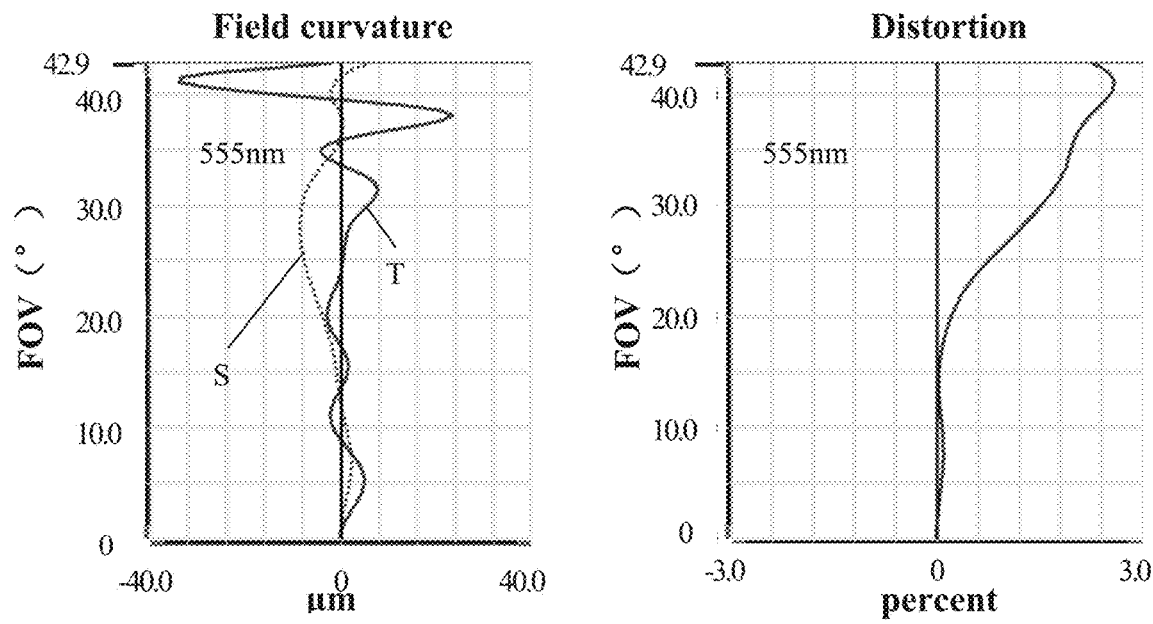
FIG. 4 is a schematic diagram of a field curvature and a distortion of the camera optical lens shown in FIG. 1.
Figure 5:
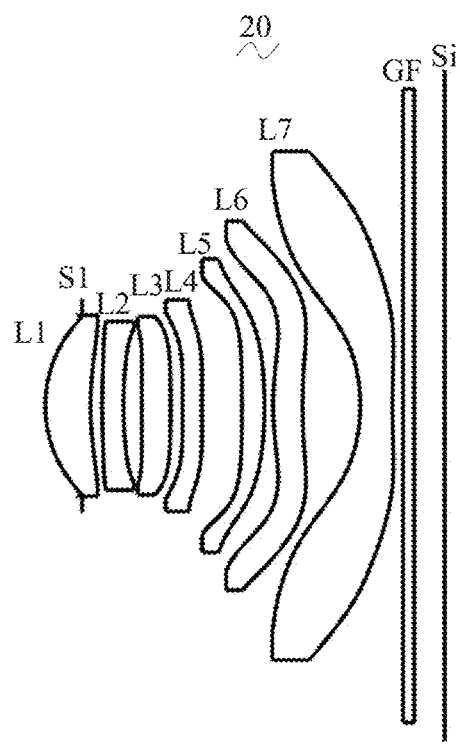
FIG. 5 is a schematic diagram of a structure of a camera optical lens according to Embodiment 2 of the present disclosure.

FIG. 2 and FIG. 3 illustrate a longitudinal aberration and a lateral color with wavelengths of 470 nm, 510 nm, 555 nm, 610 nm and 650 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, 3, 4 and values corresponding to parameters which are specified in the above conditions.

As shown in Table 17, Embodiment 1 satisfies the above conditions.

In this Embodiment, an entrance pupil diameter of the camera optical lens is 3.379 mm, an image height of 1.0H is 6.25 mm, a FOV (field of view) in a diagonal direction is 85.80°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

|  | R |  | d | nd |  | νd |
|---|---|---|---|---|---|---|
| S1 | ∞ | d0= | −0.688 | | | |
| R1 | 2.368 | d1= | 0.847 | nd1 | 1.5444 | ν 1 | 55.82 |
| R2 | 5.832 | d2= | 0.216 | | | |
| R3 | 12.259 | d3= | 0.401 | nd2 | 1.6700 | ν 2 | 19.39 |
| R4 | 7.696 | d4= | 0.343 | | | |
| R5 | 67.703 | d5= | 0.540 | nd3 | 1.5346 | ν 3 | 55.69 |
| R6 | −43.389 | d6= | 0.220 | | | |
| R7 | 31.087 | d7= | 0.365 | nd4 | 1.6610 | ν 4 | 20.53 |
| R8 | 24.812 | d8= | 0.752 | | | |
| R9 | −28.932 | d9= | 0.418 | nd5 | 1.5346 | ν 5 | 55.69 |
| R10 | −8.773 | d10= | 0.162 | | | |
| R11 | 5.352 | d11= | 0.552 | nd6 | 1.5661 | ν 6 | 37.71 |
| R12 | 11.994 | d12= | 1.080 | | | |
| R13 | −3.343 | d13= | 0.600 | nd7 | 1.5444 | ν 7 | 55.82 |
| R14 | 12.922 | d14= | 0.200 | | | |
| R15 | ∞ | d15= | 0.210 | ndg | 1.5168 | ν g | 64.17 |
| R16 | ∞ | d16= | 0.572 | | | |

Table 6 shows aspherical surface data of each lens of the camera optical lens 20 in Embodiment 2 of the present disclosure.

TABLE 6

| | Conic coefficient | Aspheric surface coefficients | | | |
|---|---|---|---|---|---|
| | k | A4 | A6 | A8 | A10 |
| R1 | −8.1322E−02 | 1.5450E−03 | −1.6566E−04 | 2.2708E−03 | −3.6225E−03 |
| R2 | −1.6458E+01 | −2.6470E−04 | −2.3303E−03 | −1.5616E−03 | 3.3559E−03 |
| R3 | −9.7502E+01 | −1.2718E−02 | 8.6912E−04 | 1.2282E−05 | 5.4329E−03 |
| R4 | −3.1603E+00 | −5.8598E−03 | 7.5984E−03 | −9.9170E−03 | 2.6430E−02 |
| R5 | 8.7860E+01 | −7.3073E−03 | −6.2523E−03 | 1.5333E−02 | −3.8041E−02 |
| R6 | −6.0501E+01 | −2.0115E−02 | 1.0418E−03 | 1.2830E−02 | −3.3661E−02 |
| R7 | −8.5393E+01 | −5.7267E−02 | 2.1894E−02 | −1.5337E−02 | 3.0810E−03 |
| R8 | 1.8537E+01 | −4.9205E−02 | 1.8593E−02 | −1.5424E−02 | 9.5607E−03 |
| R9 | −5.6498E+01 | −1.0907E−02 | 1.5620E−02 | −2.0625E−02 | 1.3294E−02 |
| R10 | −6.5193E+01 | −3.4958E−02 | 2.7228E−02 | −2.6101E−02 | 1.5273E−02 |
| R11 | −1.0302E+01 | −7.0160E−03 | −1.9222E−03 | −6.8638E−03 | 4.6867E−03 |
| R12 | 4.9352E+00 | 1.3875E−02 | −1.3990E−02 | 1.8033E−03 | 5.0038E−04 |
| R13 | −5.9924E−01 | −1.0722E−02 | −5.7146E−03 | 3.0561E−03 | −5.4014E−04 |
| R14 | −6.5115E−01 | −1.6436E−02 | −1.5534E−03 | 8.9955E−04 | −1.4205E−04 |

| | Aspheric surface coefficients | | | | |
|---|---|---|---|---|---|
| | A12 | A14 | A16 | A18 | A20 |
| R1 | 3.3629E−03 | −1.8633E−03 | 5.9820E−04 | −1.0167E−04 | 6.5036E−06 |
| R2 | −3.3293E−03 | 2.0208E−03 | −7.5212E−04 | 1.5373E−04 | −1.3268E−05 |
| R3 | −6.5983E−03 | 4.2862E−03 | −1.6389E−03 | 3.4551E−04 | −3.0455E−05 |
| R4 | −3.2839E−02 | 2.4213E−02 | −1.0497E−02 | 2.4656E−03 | −2.3683E−04 |
| R5 | 4.9020E−02 | −3.7369E−02 | 1.6815E−02 | −4.1510E−03 | 4.3488E−04 |
| R6 | 3.4530E−02 | −2.0266E−02 | 6.9039E−03 | −1.2468E−03 | 9.0618E−05 |
| R7 | 5.0603E−03 | −5.8496E−03 | 2.7646E−03 | −6.0078E−04 | 4.8392E−05 |
| R8 | −3.6067E−03 | 5.9320E−04 | 7.6467E−05 | −4.0364E−05 | 3.8618E−06 |
| R9 | −5.3856E−03 | 1.3627E−03 | −2.1170E−04 | 1.8719E−05 | −7.2070E−07 |
| R10 | −5.4164E−03 | 1.1563E−03 | −1.4417E−04 | 9.6558E−06 | −2.6836E−07 |
| R11 | −1.4626E−03 | 2.5371E−04 | −2.4964E−05 | 1.3057E−06 | −2.8273E−08 |
| R12 | −2.3789E−04 | 4.1900E−05 | −3.8558E−06 | 1.8305E−07 | −3.5373E−09 |
| R13 | 5.1813E−05 | −2.9852E−06 | 1.0361E−07 | −2.0033E−09 | 1.6609E−11 |
| R14 | 1.2395E−05 | −6.6962E−07 | 2.2375E−08 | −4.2340E−10 | 3.4555E−12 |

Table 7 and table 8 show design data of inflexion points and arrest points of each lens of the camera optical lens 20 lens according to Embodiment 2 of the present disclosure.

TABLE 7

|  | Number(s) of inflexion points | Inflexion point position 1 | Inflexion point position 2 | Inflexion point position 3 |
|---|---|---|---|---|
| P1R1 | 1 | 1.625 | | |
| P1R2 | 1 | 1.085 | | |
| P2R1 | 2 | 0.685 | 0.955 | |
| P2R2 | 0 | | | |
| P3R1 | 1 | 0.385 | | |
| P3R2 | 0 | | | |
| P4R1 | 1 | 0.225 | | |
| P4R2 | 2 | 0.275 | 1.585 | |
| P5R1 | 1 | 2.165 | | |
| P5R2 | 2 | 2.125 | 2.745 | |
| P6R1 | 3 | 0.825 | 2.495 | 3.075 |
| P6R2 | 3 | 0.925 | 3.165 | 3.425 |
| P7R1 | 2 | 1.985 | 4.165 | |
| P7R2 | 1 | 0.615 | | |

TABLE 8

|  | Number of arrest points | Arrest point position 1 |
|---|---|---|
| P1R1 | 0 | |
| P1R2 | 1 | 1.605 |
| P2R1 | 0 | |
| P2R2 | 0 | |
| P3R1 | 1 | 0.625 |
| P3R2 | 0 | |
| P4R1 | 1 | 0.385 |
| P4R2 | 1 | 0.475 |
| P5R1 | 0 | |
| P5R2 | 0 | |
| P6R1 | 1 | 1.345 |
| P6R2 | 1 | 1.405 |
| P7R1 | 0 | |
| P7R2 | 1 | 1.065 |

Figure 6:
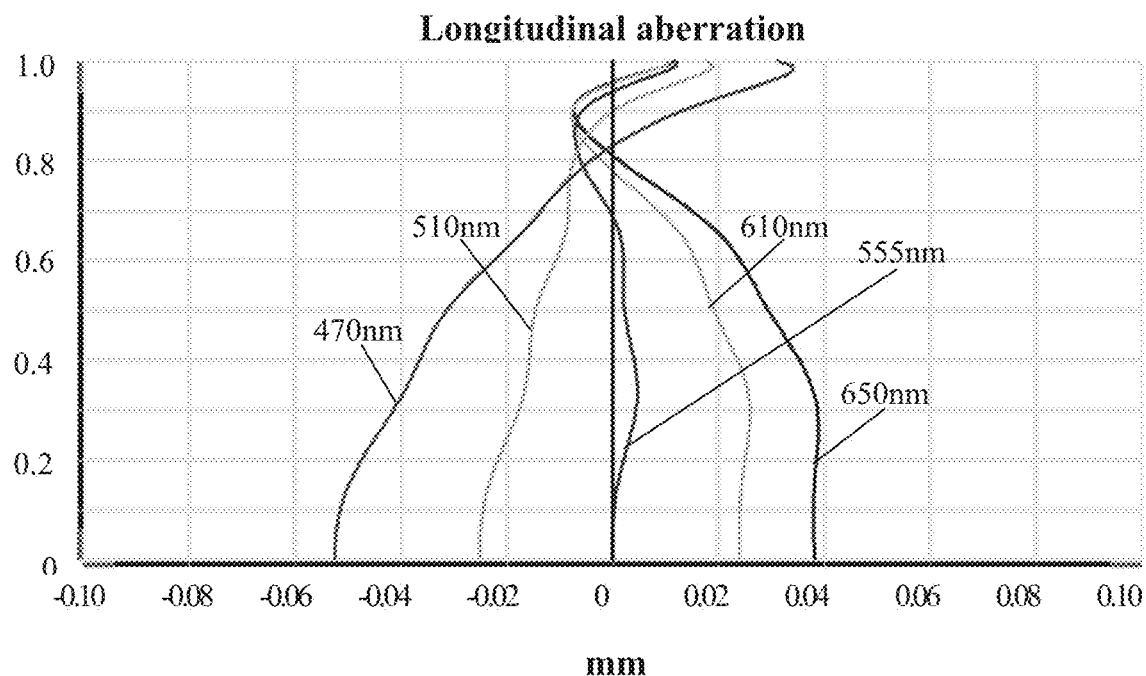
FIG. 6 is a schematic diagram of a longitudinal aberration of the camera optical lens shown in FIG. 5.
Figure 7:
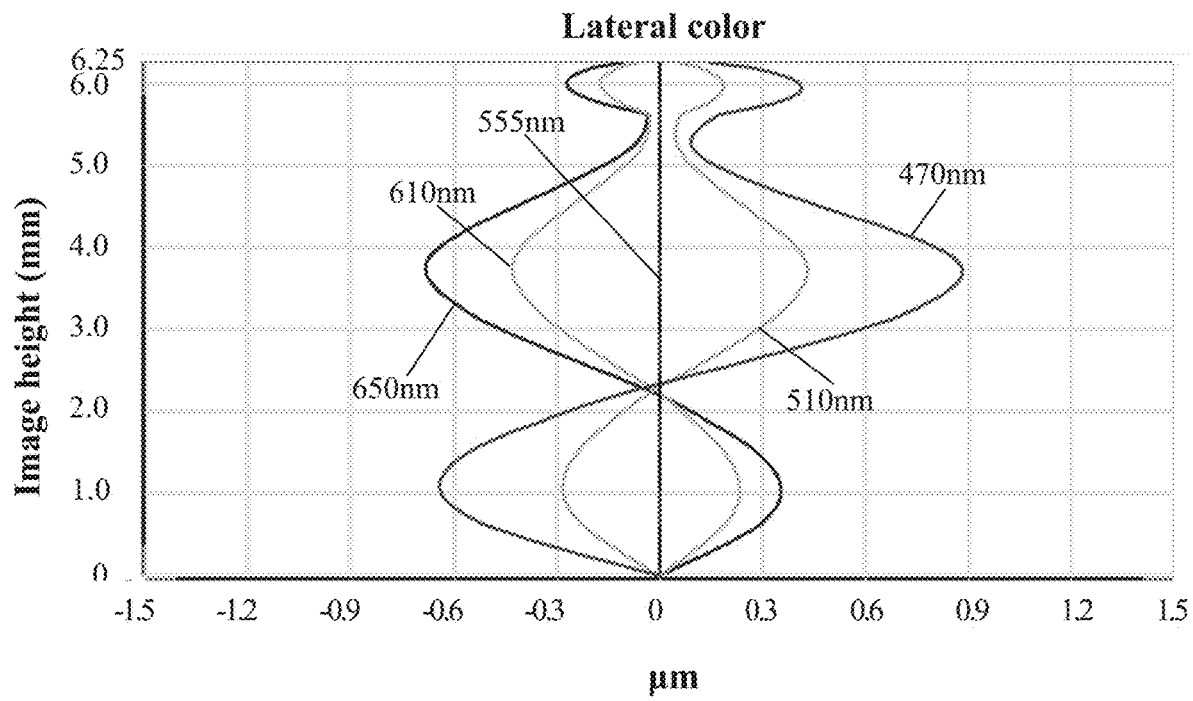
FIG. 7 is a schematic diagram of a lateral color of the camera optical lens shown in FIG. 5.
Figure 8:
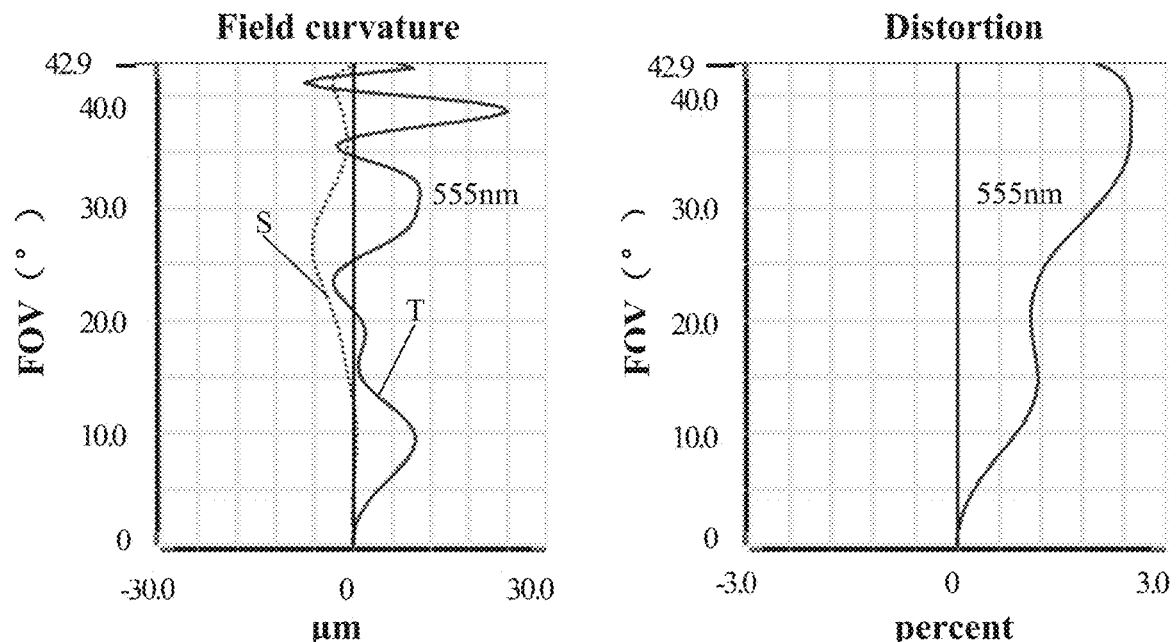
FIG. 8 is a schematic diagram of a field curvature and a distortion of the camera optical lens shown in FIG. 5.
Figure 9:
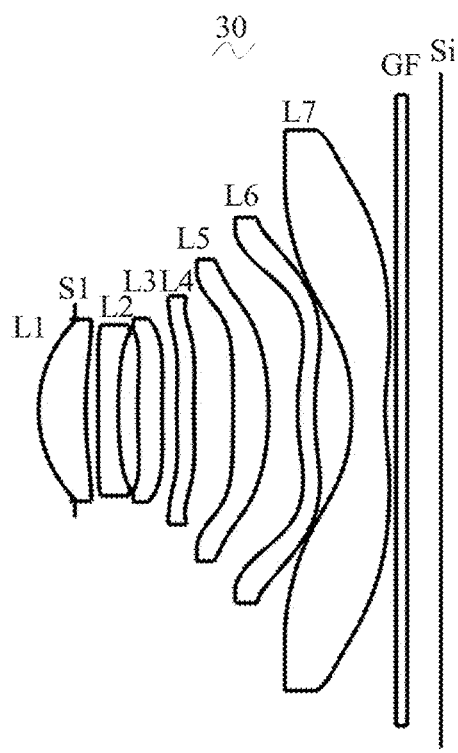
FIG. 9 is a schematic diagram of a structure of a camera optical lens according to Embodiment 3 of the present disclosure.

FIG. 6 and FIG. 7 illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies the above conditions.

In an embodiment, an entrance pupil diameter of the camera optical lens is 3.388 mm, an image height of 1.0 H is 6.25 mm, a FOV (field of view) in the diagonal direction is 85.80°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

The fourth lens L4 has a positive refractive power, the image-side surface of the third lens L3 is convex in the proximal region.

Table 9 and Table 10 show design data of a camera optical lens 30 in Embodiment 3 of the present disclosure.

TABLE 9

|  | R | d | nd |  | vd |  |
|---|---|---|---|---|---|---|
| S1 | ∞ | d0= | −0.676 | | | |
| R1 | 2.374 | d1= | 0.876 | nd1 | 1.5444 | v 1 55.82 |
| R2 | 7.633 | d2= | 0.234 | | | |
| R3 | 132.639 | d3= | 0.371 | nd2 | 1.6700 | v 2 19.39 |
| R4 | 8.709 | d4= | 0.364 | | | |
| R5 | 12.794 | d5= | 0.454 | nd3 | 1.5346 | v 3 55.69 |
| R6 | 28.498 | d6= | 0.271 | | | |
| R7 | 11.061 | d7= | 0.318 | nd4 | 1.6610 | v 4 20.53 |
| R8 | 12.360 | d8= | 0.727 | | | |
| R9 | −50.596 | d9= | 0.661 | nd5 | 1.5346 | v 5 55.69 |
| R10 | −5.198 | d10= | 0.540 | | | |
| R11 | 5.669 | d11= | 0.321 | nd6 | 1.5661 | v 6 37.71 |
| R12 | 8.011 | d12= | 0.684 | | | |
| R13 | −4.616 | d13= | 0.622 | nd7 | 1.5444 | v 7 55.82 |
| R14 | 4.831 | d14= | 0.200 | | | |
| R15 | ∞ | d15= | 0.210 | ndg | 1.5168 | v g 64.17 |
| R16 | ∞ | d16= | 0.627 | | | |

Table 10 shows aspherical surface data of each lens of the camera optical lens 30 in Embodiment 3 of the present disclosure.

TABLE 10

|  | Conic coefficient | Aspherical surface coefficients | | | |
|---|---|---|---|---|---|
|  | k | A4 | A6 | A8 | A10 |
| R1 | −8.6659E−02 | 1.4929E−03 | 4.8522E−04 | 1.6772E−03 | −3.8131E−03 |
| R2 | −1.7343E+01 | −3.6685E−03 | −2.0938E−04 | −1.7079E−04 | 2.6330E−04 |
| R3 | 3.6080E+01 | −1.0905E−02 | 6.8380E−03 | 5.4264E−04 | 4.1195E−04 |
| R4 | 1.2664E+01 | −3.5331E−03 | 1.6621E−02 | −2.3716E−02 | 4.4958E−02 |
| R5 | −7.7475E+01 | −1.3971E−02 | −2.1245E−04 | −1.4644E−03 | −9.8194E−03 |
| R6 | −6.1122E+01 | −2.7058E−02 | 1.3051E−02 | −2.0563E−02 | 1.6281E−02 |
| R7 | 2.3225E+01 | −6.1947E−02 | 4.0499E−02 | −6.2501E−02 | 6.8450E−02 |
| R8 | 4.6773E+00 | −5.1598E−02 | 2.4786E−02 | −3.1054E−02 | 2.7726E−02 |
| R9 | −3.5217E+01 | −3.2890E−03 | −9.7874E−03 | 4.4057E−03 | −9.8058E−04 |
| R10 | −4.0218E+01 | −2.9467E−02 | 2.9959E−03 | −5.2442E−04 | 1.7575E−03 |
| R11 | −1.3508E+01 | 4.2780E−02 | −6.2284E−02 | 2.6955E−02 | −6.3502E−03 |
| R12 | 2.6731E+00 | 5.1850E−02 | −6.6958E−02 | 2.8576E−02 | −7.0244E−03 |
| R13 | −3.6496E−01 | −3.1807E−02 | 6.1701E−03 | 5.7057E−05 | −1.1755E−04 |
| R14 | −2.9751E−01 | −5.3333E−02 | 1.3814E−02 | −2.3318E−03 | 2.4806E−04 |

TABLE 10-continued

| | Aspherical surface coefficients | | | | |
|---|---|---|---|---|---|
| | A12 | A14 | A16 | A18 | A20 |
| R1 | 4.1683E−03 | −2.5701E−03 | 9.0245E−04 | −1.6856E−04 | 1.2495E−05 |
| R2 | −3.8580E−04 | 2.8230E−04 | −1.3365E−04 | 3.3180E−05 | −3.3293E−06 |
| R3 | −2.2703E−03 | 2.1147E−03 | −9.2751E−04 | 2.0683E−04 | −1.8319E−05 |
| R4 | −5.1554E−02 | 3.5874E−02 | −1.4741E−02 | 3.2897E−03 | −3.0160E−04 |
| R5 | 1.5935E−02 | −1.2789E−02 | 5.6381E−03 | −1.3151E−03 | 1.2647E−04 |
| R6 | −9.7855E−03 | 3.8177E−03 | −8.6060E−04 | 1.0402E−04 | −6.0645E−06 |
| R7 | −4.8570E−02 | 2.1448E−02 | −5.5578E−03 | 7.7107E−04 | −4.4326E−05 |
| R8 | −1.5918E−02 | 5.7234E−03 | −1.2009E−03 | 1.3334E−04 | −6.0560E−06 |
| R9 | −4.5986E−04 | 2.7290E−04 | −5.1319E−05 | 4.2606E−06 | −1.3450E−07 |
| R10 | −1.3581E−03 | 4.3358E−04 | −6.8364E−05 | 5.3173E−06 | −1.6371E−07 |
| R11 | 8.0579E−04 | −4.6224E−05 | −1.5934E−07 | 1.3941E−07 | −4.5219E−09 |
| R12 | 1.0670E−03 | −1.0121E−04 | 5.8297E−06 | −1.8630E−07 | 2.5322E−09 |
| R13 | 1.4932E−05 | −9.4003E−07 | 3.3349E−08 | −6.3928E−10 | 5.1754E−12 |
| R14 | −1.6924E−05 | 7.3794E−07 | −1.9877E−08 | 3.0171E−10 | −1.9810E−12 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 1.615 | | |
| P1R2 | 1 | 1.115 | | |
| P2R1 | 2 | 0.255 | 0.755 | |
| P2R2 | 0 | | | |
| P3R1 | 1 | 0.575 | | |
| P3R2 | 1 | 0.345 | | |
| P4R1 | 3 | 0.395 | 1.465 | 1.835 |
| P4R2 | 3 | 0.395 | 1.545 | 2.055 |
| P5R1 | 2 | 2.025 | 2.465 | |
| P5R2 | 2 | 2.055 | 2.585 | |
| P6R1 | 3 | 0.805 | 2.555 | 3.255 |
| P6R2 | 2 | 0.845 | 3.055 | |
| P7R1 | 2 | 1.885 | 4.405 | |
| P7R2 | 3 | 0.665 | 4.325 | 4.745 |

TABLE 12

| | Number of arrest points | Arrest point position 1 | Arrest point position 2 | Arrest point position 3 |
|---|---|---|---|---|
| P1R1 | 0 | | | |
| P1R2 | 1 | 1.585 | | |
| P2R1 | 2 | 0.465 | 0.915 | |
| P2R2 | 0 | | | |
| P3R1 | 1 | 0.925 | | |
| P3R2 | 1 | 0.605 | | |
| P4R1 | 1 | 0.695 | | |
| P4R2 | 3 | 0.695 | 1.895 | 2.165 |
| P5R1 | 0 | | | |
| P5R2 | 0 | | | |
| P6R1 | 1 | 1.295 | | |
| P6R2 | 1 | 1.335 | | |
| P7R1 | 1 | 4.255 | | |
| P7R2 | 1 | 1.445 | | |

Figure 10:
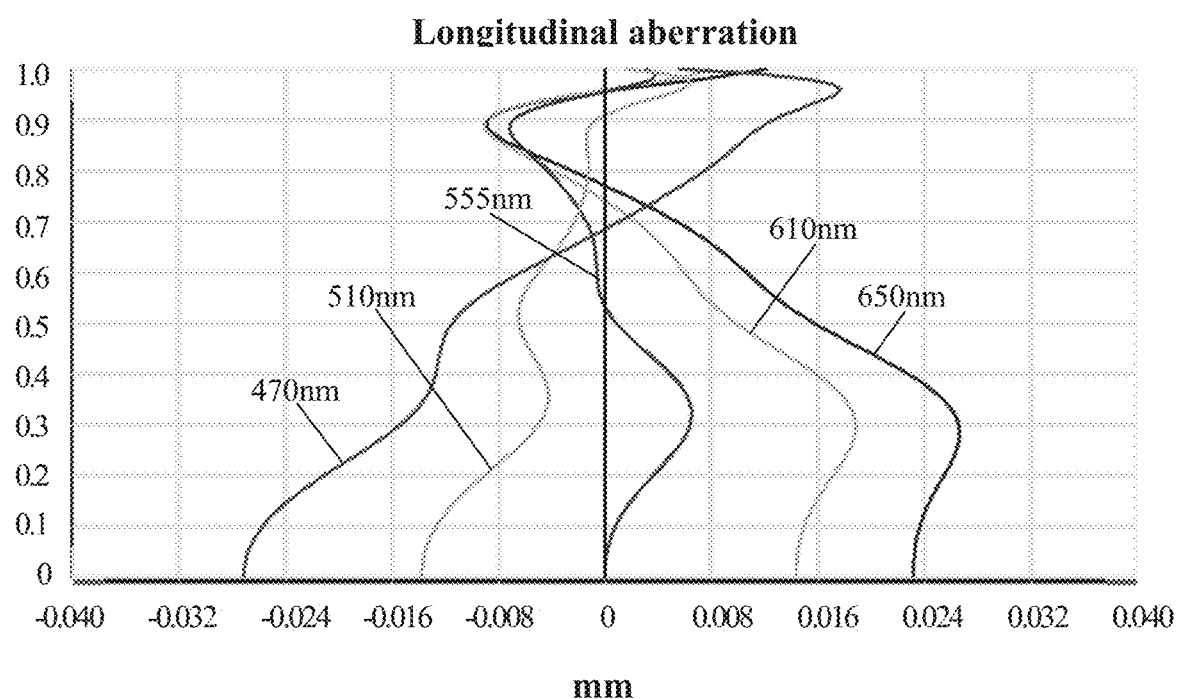
FIG. 10 is a schematic diagram of a longitudinal aberration of the camera optical lens shown in FIG. 9.
Figure 11:
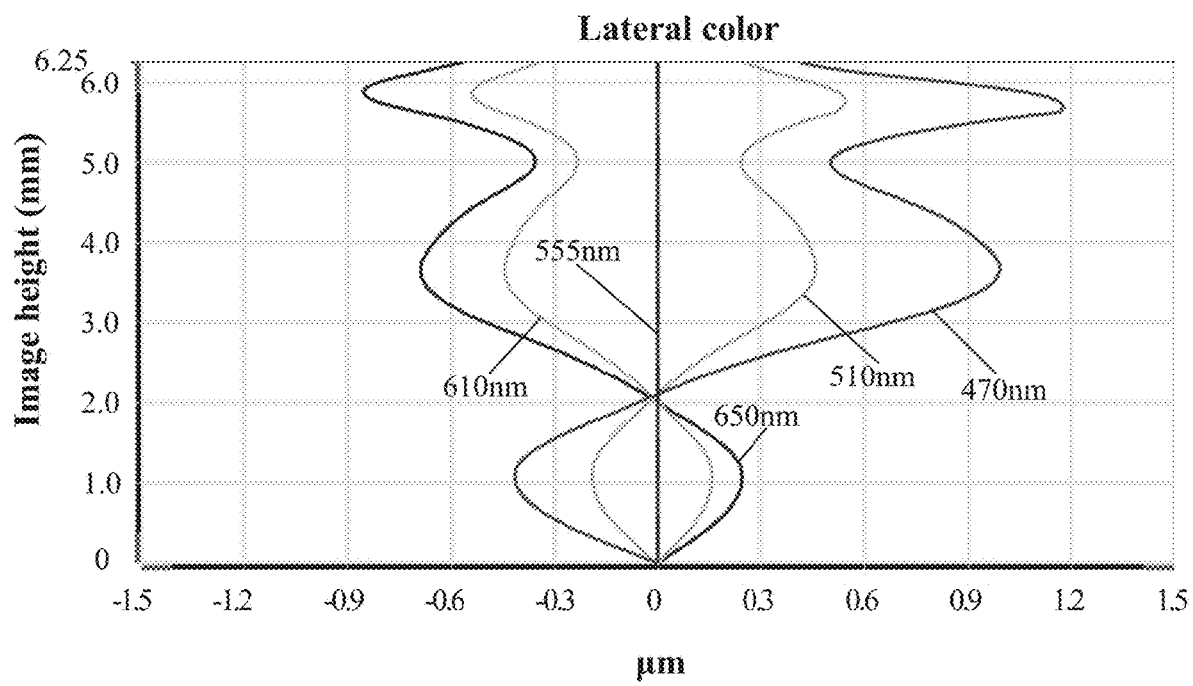
FIG. 11 is a schematic diagram of a lateral color of the camera optical lens shown in FIG. 9.
Figure 12:
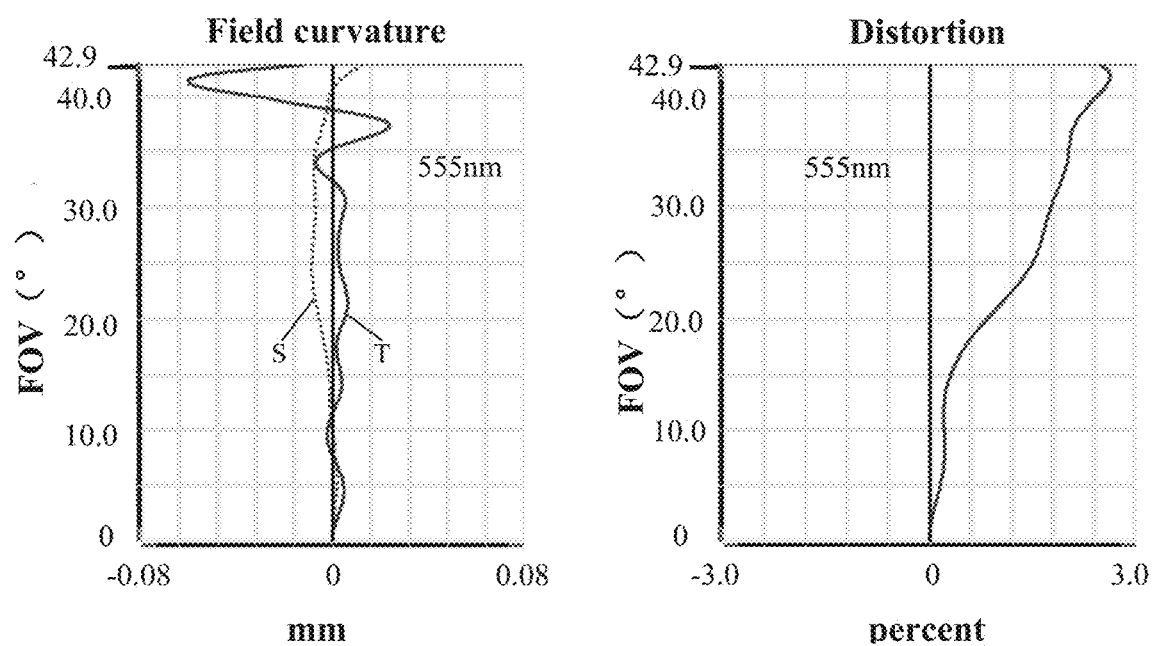
FIG. 12 is a schematic diagram of a field curvature and a distortion of the camera optical lens shown in FIG. 9.
Figure 13:
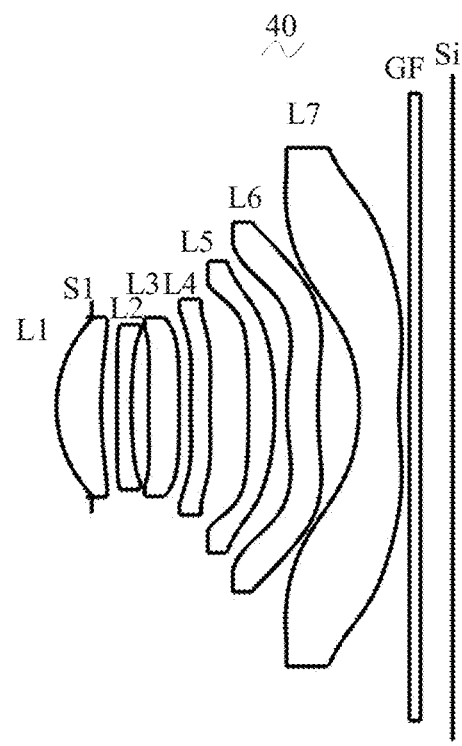
FIG. 13 is a schematic diagram of a structure of a camera optical lens according to Embodiment 4 of the present disclosure.

FIG. 10 and FIG. 11 illustrate a longitudinal aberration and a lateral color of light with wavelengths of 470 nm, 510 nm, 555 nm, 610 nm and 650 nm after passing the camera optical lens 30 according to Embodiment 3. FIG. 12 illustrates a field curvature and a distortion of light with a wavelength of 555 nm after passing the camera optical lens 30 according to Embodiment 3.

Table 17 in the following lists values corresponding to the respective conditions in an embodiment according to the above conditions. Obviously, the embodiment satisfies the above conditions.

In an embodiment, an entrance pupil diameter of the camera optical lens is 3.370 mm, an image height of 1.0H is 6.25 mm, a FOV (field of view) in the diagonal direction is 85.80°. Thus, the camera optical lens has a wide-angle and is ultra-thin. Its on-axis and off-axis chromatic aberrations are fully corrected, thereby achieving excellent optical characteristics.

Embodiment 4

Embodiment 4 is basically the same as Embodiment 1 and involves symbols having the same meanings as Embodiment 1, and only differences therebetween will be described in the following.

The fourth lens L4 has a positive refractive power, the image-side surface of the third lens L3 is convex in the proximal region.

Table 13 and Table 14 show design data of a camera optical lens 40 in Embodiment 4 of the present disclosure.

TABLE 13

| | R | d | | nd | | vd | |
|---|---|---|---|---|---|---|---|
| S1 | ∞ | d0= | −0.665 | | | | |
| R1 | 2.408 | d1= | 0.843 | nd1 | 1.5444 | v 1 | 55.82 |
| R2 | 7.441 | d2= | 0.296 | | | | |
| R3 | 30.816 | d3= | 0.276 | nd2 | 1.6700 | v 2 | 19.39 |
| R4 | 9.033 | d4= | 0.324 | | | | |
| R5 | 23.081 | d5= | 0.575 | nd3 | 1.5346 | v 3 | 55.69 |
| R6 | 388.397 | d6= | 0.220 | | | | |
| R7 | 12.536 | d7= | 0.366 | nd4 | 1.6610 | v 4 | 20.53 |
| R8 | 14.041 | d8= | 0.726 | | | | |
| R9 | −34.408 | d9= | 0.494 | nd5 | 1.5346 | v 5 | 55.69 |
| R10 | −8.051 | d10= | 0.235 | | | | |
| R11 | 5.661 | d11= | 0.587 | nd6 | 1.5661 | v 6 | 37.71 |
| R12 | 11.601 | d12= | 0.773 | | | | |
| R13 | −3.834 | d13= | 0.750 | nd7 | 1.5444 | v 7 | 55.82 |
| R14 | 6.402 | d14= | 0.200 | | | | |
| R15 | ∞ | d15= | 0.210 | ndg | 1.5168 | v g | 64.17 |
| R16 | ∞ | d16= | 0.605 | | | | |

Table 14 shows aspherical surface data of each lens of the camera optical lens 30 in Embodiment 4 of the present disclosure.

TABLE 14

| | Conic coefficient | Aspherical surface coefficients | | | |
|---|---|---|---|---|---|
| | k | A4 | A6 | A8 | A10 |
| R1 | −1.0841E−01 | 1.0885E−03 | 2.0677E−03 | −3.2780E−03 | 3.9734E−03 |
| R2 | −1.5388E+01 | −3.4903E−03 | 4.4386E−04 | −1.2525E−03 | 1.5831E−03 |
| R3 | 9.8336E+01 | −2.2682E−02 | 1.0759E−02 | 4.3688E−03 | −7.1116E−03 |
| R4 | −4.2863E+00 | −1.5337E−02 | 2.0355E−02 | −1.4165E−02 | 2.1148E−02 |
| R5 | −4.3963E+01 | −1.3426E−02 | −2.2104E−03 | 1.3853E−03 | −2.1887E−03 |
| R6 | 8.8807E+01 | −2.4947E−02 | 1.0056E−03 | 1.2253E−02 | −2.8399E−02 |
| R7 | 1.1239E+01 | −5.6520E−02 | 2.3120E−02 | −3.0633E−02 | 3.5367E−02 |
| R8 | 1.1453E+01 | −4.5667E−02 | 1.1492E−02 | −8.7973E−03 | 5.8116E−03 |
| R9 | 7.6383E+01 | −6.3723E−03 | 3.5009E−03 | −1.2473E−02 | 1.2912E−02 |
| R10 | −6.8778E+01 | −2.4708E−02 | −1.0451E−02 | 1.0879E−02 | −2.4660E−03 |
| R11 | −1.5224E+01 | 1.2647E−02 | −4.4381E−02 | 2.2127E−02 | −5.6501E−03 |
| R12 | 3.0717E+00 | 3.2926E−02 | −4.1071E−02 | 1.6148E−02 | −3.7150E−03 |
| R13 | −5.7331E−01 | −1.3292E−02 | −2.7942E−03 | 1.8912E−03 | −3.2406E−04 |
| R14 | 4.7998E−02 | −3.5456E−02 | 5.6216E−03 | −6.5193E−04 | 6.2839E−05 |

| | Aspherical surface coefficients | | | | |
|---|---|---|---|---|---|
| | A12 | A14 | A16 | A18 | A20 |
| R1 | −3.0484E−03 | 1.4800E−03 | −4.5303E−04 | 7.9836E−05 | −6.5416E−06 |
| R2 | −1.4846E−03 | 8.5948E−04 | −3.0940E−04 | 6.1857E−05 | −5.3601E−06 |
| R3 | 5.3868E−03 | −2.6360E−03 | 8.4801E−04 | −1.6082E−04 | 1.4078E−05 |
| R4 | −2.0566E−02 | 1.1968E−02 | −3.9235E−03 | 6.4167E−04 | −3.3763E−05 |
| R5 | −5.1238E−04 | 2.0036E−03 | −1.5661E−03 | 5.6184E−04 | −8.2400E−05 |
| R6 | 2.8410E−02 | −1.6944E−02 | 6.0479E−03 | −1.1785E−03 | 9.5399E−05 |
| R7 | −2.7066E−02 | 1.2576E−02 | −3.3579E−03 | 4.7952E−04 | −2.9080E−05 |
| R8 | −2.3466E−03 | 4.1506E−04 | 5.4922E−05 | −2.9729E−05 | 2.8403E−06 |
| R9 | −7.4577E−03 | 2.4537E−03 | −4.7073E−04 | 4.9491E−05 | −2.1926E−06 |
| R10 | −5.1915E−04 | 3.3130E−04 | −5.9717E−05 | 4.7987E−06 | −1.4752E−07 |
| R11 | 6.9195E−04 | −1.9163E−05 | −4.1549E−06 | 4.2129E−07 | −1.2086E−08 |
| R12 | 5.1244E−04 | −4.0980E−05 | 1.7264E−06 | −2.7929E−08 | −9.6124E−11 |
| R13 | 2.9236E−05 | −1.5698E−06 | 5.0582E−08 | −9.0637E−10 | 6.9561E−12 |
| R14 | −4.9011E−06 | 2.6307E−07 | −8.6134E−09 | 1.5374E−10 | −1.1513E−12 |

Table 15 and Table 16 show design data inflexion points and arrest points of the respective lenses in the camera optical lens 40 according to Embodiment 4 of the present disclosure.

TABLE 15

| | Number(s) of inflexion points | Inflexion point position 1 | Inflexion point position 2 | Inflexion point position 3 |
|---|---|---|---|---|
| P1R1 | 1 | 1.625 | | |
| P1R2 | 1 | 1.155 | | |
| P2R1 | 2 | 0.395 | 0.795 | |
| P2R2 | 0 | | | |
| P3R1 | 1 | 0.495 | | |
| P3R2 | 1 | 0.095 | | |
| P4R1 | 3 | 0.365 | 1.555 | 1.645 |
| P4R2 | 2 | 0.385 | 1.565 | |
| P5R1 | 1 | 2.095 | | |
| P5R2 | 2 | 2.125 | 2.775 | |
| P6R1 | 3 | 0.715 | 2.415 | 3.085 |
| P6R2 | 3 | 0.845 | 3.235 | 3.505 |
| P7R1 | 2 | 2.025 | 4.385 | |
| P7R2 | 3 | 0.675 | 4.125 | 4.795 |

TABLE 16

| | Number of arrest points | Arrest point position 1 | Arrest point position 2 |
|---|---|---|---|
| P1R1 | 0 | | |
| P1R2 | 1 | 1.615 | |
| P2R1 | 0 | | |
| P2R2 | 0 | | |
| P3R1 | 1 | 0.815 | |
| P3R2 | 1 | 0.165 | |
| P4R1 | 1 | 0.645 | |
| P4R2 | 2 | 0.665 | 1.955 |
| P5R1 | 0 | | |
| P5R2 | 0 | | |
| P6R1 | 1 | 1.175 | |
| P6R2 | 1 | 1.305 | |
| P7R1 | 2 | 4.035 | 4.595 |
| P7R2 | 1 | 1.275 | |

Figure 14:
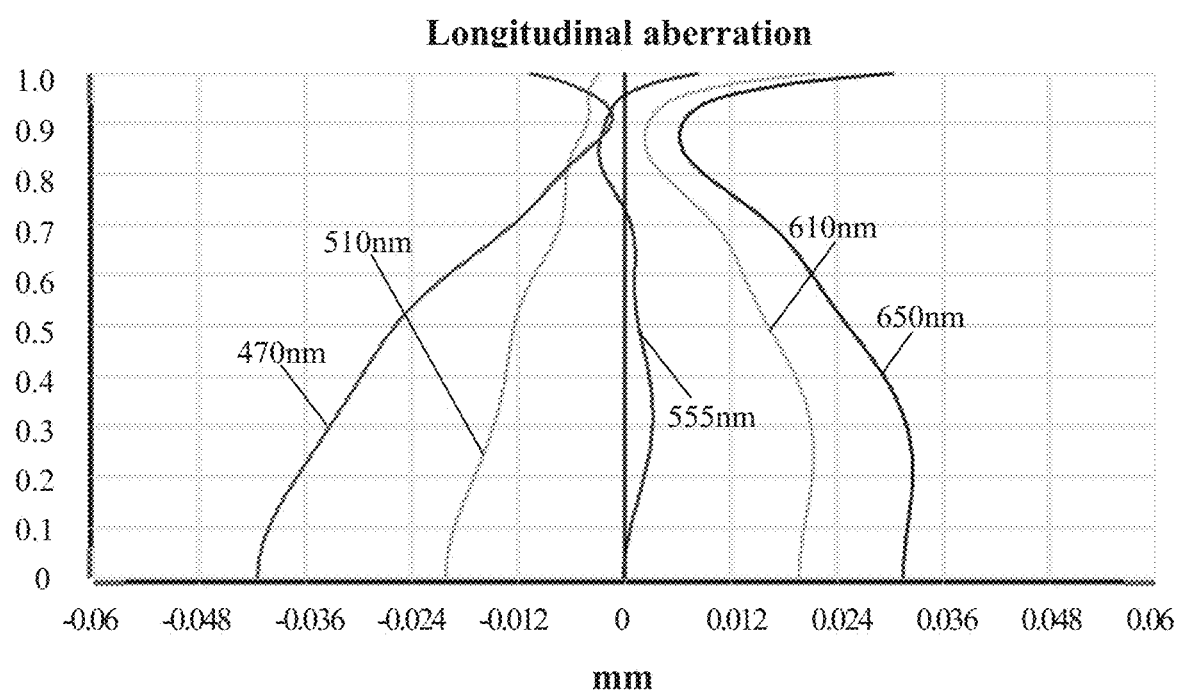
FIG. 14 is a schematic diagram of a longitudinal aberration of the camera optical lens shown in FIG. 13.
Figure 15:
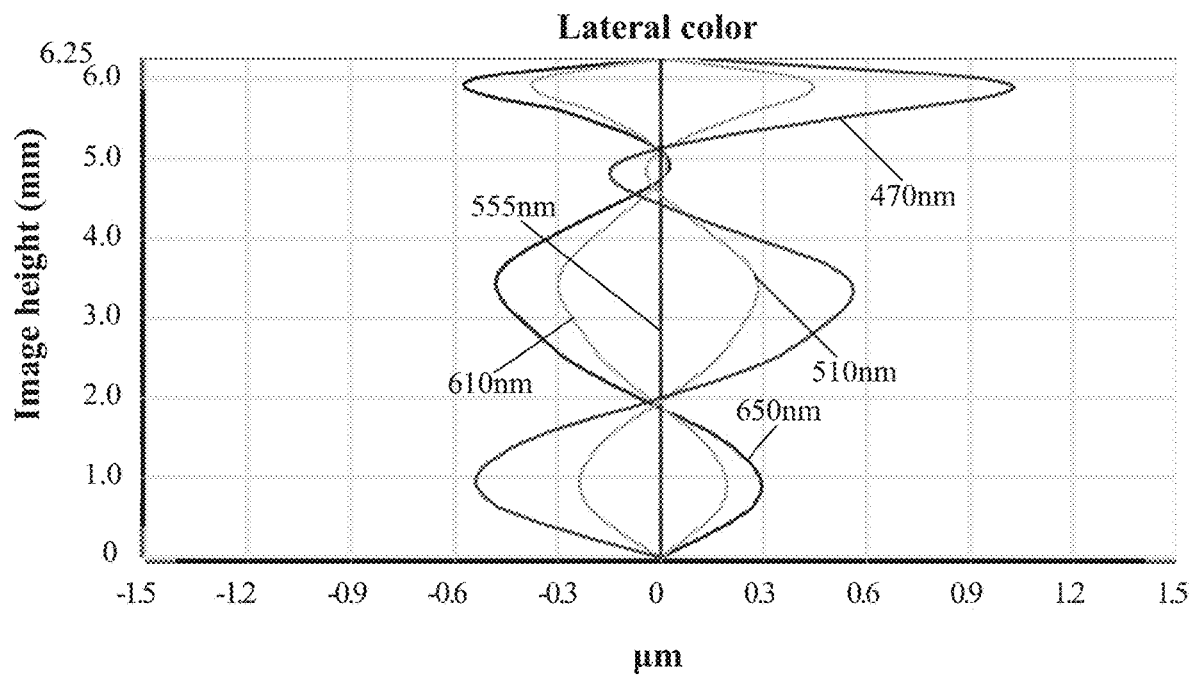
FIG. 15 is a schematic diagram of a lateral color of the camera optical lens shown in FIG. 13.
Figure 16:
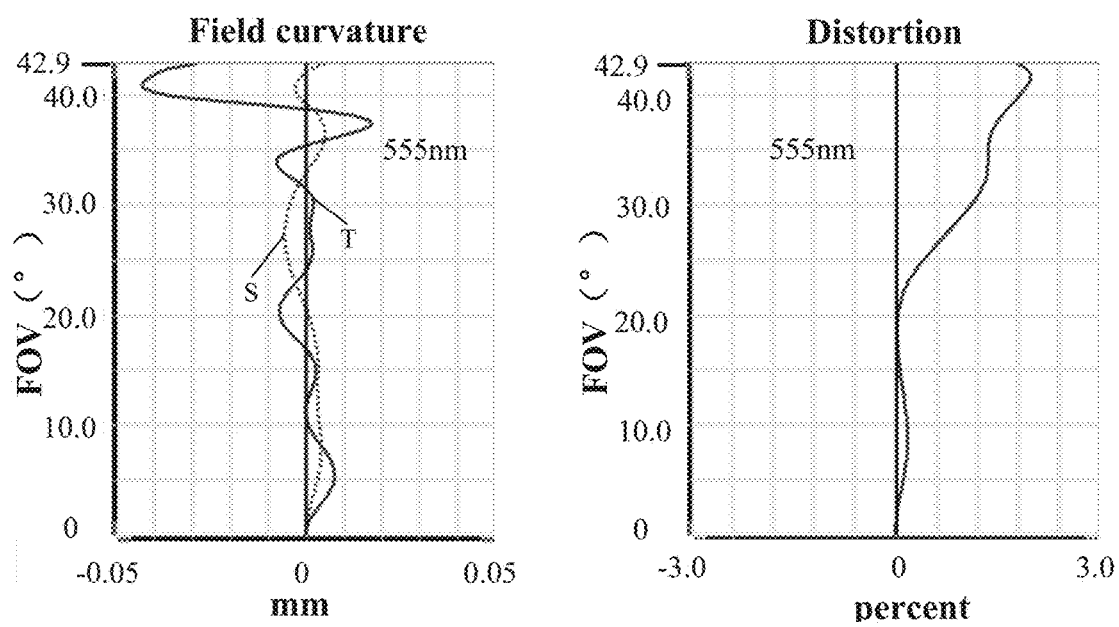
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 470 nm, 510 nm, 555 nm, 610 nm and 650 nm after passing the camera optical lens 40 according to Embodiment 4. FIG. 16 illustrates a field curvature and a distortion of light with a wavelength of 555 nm after passing the camera optical lens 30 according to Embodiment 4.

Table 17 in the following lists values corresponding to the respective conditions in an embodiment according to the above conditions. Obviously, the embodiment satisfies the above conditions.

In an embodiment, an entrance pupil diameter of the camera optical lens is 3.394 mm, an image height of 1.0H is 6.25 mm, a FOV (field of view) in the diagonal direction is 85.80°. Thus, the camera optical lens has a wide-angle and is ultra-thin. Its on-axis and off-axis chromatic aberrations are fully corrected, thereby achieving excellent optical characteristics.

TABLE 17

| | Parameters and conditions | | | |
|---|---|---|---|---|
| | Embodiment 1 | Embodiment 2 | Embodiment 3 | Embodiment 4 |
| f | 6.588 | 6.606 | 6.572 | 6.617 |
| f1 | 6.150 | 6.720 | 5.957 | 6.153 |
| f2 | −19.153 | −31.708 | −13.801 | −18.996 |
| f3 | 38.067 | 49.385 | 42.853 | 45.728 |
| f4 | −389.440 | −188.747 | 143.799 | 159.936 |
| f5 | 27.121 | 23.305 | 10.747 | 19.467 |
| f6 | 11.859 | 16.496 | 32.466 | 18.764 |
| f7 | −4.072 | −4.800 | −4.224 | −4.280 |
| f12 | 8.190 | 7.974 | 9.042 | 8.269 |
| Fno | 1.95 | 1.95 | 1.95 | 1.95 |
| f6/f | 1.80 | 2.50 | 4.94 | 2.84 |
| R14/R13 | −0.47 | −0.26 | −0.96 | −0.60 |
| f2/f | −2.91 | −4.80 | −2.10 | −2.87 |
| d8/d9 | 1.48 | 1.80 | 1.10 | 1.47 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
a first lens having a positive refractive power;
a second lens having a negative refractive power;
a third lens having a positive refractive power;
a fourth lens,
a fifth lens having a positive refractive power;
a sixth lens having a positive refractive power; and
a seventh lens having a negative refractive power;
wherein the camera optical lens satisfies following conditions:

$1.70 \leq f6/f \leq 5.00$;

$-4.00 \leq R14/R13 \leq -1.00$;

$-5.00 \leq f2/f \leq -2.00$; and $1.00 \leq d8/d9 \leq 2.00$;

where
f denotes a focal length of the camera optical lens;
f2 denotes a focal length of the second lens;
f6 denotes a focal length of the sixth lens;
R13 denotes a curvature radius of the object-side surface of the seventh lens;
R14 denotes a curvature radius of the image-side surface of the seventh lens;
d8 denotes an on-axis distance from the image-side surface of the fourth lens to the object-side surface of the fifth lens; and
d9 denotes an on-axis thickness of the fifth lens.

2. The camera optical lens according to claim 1 further satisfying following conditions:

$1.00 \leq d12/d13 \leq 2.00$;

where
d12 denotes an on-axis distance from the image-side surface of the sixth lens to the object-side surface of the seventh lens; and
d9 denotes an on-axis thickness of the seventh lens.

3. The camera optical lens according to claim 1, further satisfying following conditions:

$0.45 \leq f1/f \leq 1.53$;

$-4.73 \leq (R1+R2)/(R1-R2) \leq -1.27$; and $0.06 \leq d1/TTL \leq 0.18$;

where
f1 denotes a focal length of the first lens;
R1 denotes a curvature radius of the object-side surface of the first lens;
R2 denotes a curvature radius of the image-side surface of the first lens;
d1 denotes an on-axis thickness of the first lens; and
TTL denotes a total optical length from the object-side surface of the first lens to an image surface of the camera optical lens along an optical axis.

4. The camera optical lens according to claim 1 further satisfying following conditions:

$0.57 \leq (R3+R4)/(R3-R4) \leq 6.56$; and $0.02 \leq d3/TTL \leq 0.08$;

where
R3 denotes a curvature radius of the object-side surface of the second lens;
R4 denotes a curvature radius of the image-side surface of the second lens;
d3 denotes an on-axis thickness of the second lens; and
TTL denotes a total optical length from the object-side surface of the first lens to an image surface of the camera optical lens along an optical axis.

5. The camera optical lens according to claim 1 further satisfies following conditions:

$2.89 \leq f3/f \leq 11.21$;

$-5.26 \leq (R5+R6)/(R5-R6) \leq 0.33$; and where
f3 denotes a focal length of the third lens;
R5 denotes a curvature radius of the object-side surface of the third lens;
R6 denotes a curvature radius of the image-side surface of the third lens;
d5 denotes an on-axis thickness of the third lens; and
TTL denotes a total optical length from the object-side surface of the first lens to an image surface of the camera optical lens along an optical axis.

6. The camera optical lens according to claim 1 further satisfies following conditions:

$-1118.23 \leq f4/f \leq 36.26$;

$-36.06 \leq (R7+R8)(R7-R8) \leq 43.89$; and $0.02 \leq d7/TTL \leq 0.07$;

Where
f4 denotes a focal length of the fourth lens;
R7 denotes a curvature radius of the object-side surface of the fourth lens;
R8 denotes a curvature radius of the image-side surface of the fourth lens;
d7 denotes an on-axis thickness of the fourth lens; and
TTL denotes a total optical length from the object-side surface of the first lens to an image surface of the camera optical lens along an optical axis.

7. The camera optical lens according to claim 1 further satisfies following conditions:

$0.82 \leq f5/f \leq 6.18$;

$0.61 \leq (R9+R10)/(R9-R10) \leq 2.81$; and $0.61 \leq (R9+R10)/(R9-R10) \leq 2381$; and $0.03 \leq d9/TTL \leq 0.13$;

where
f5 denotes a focal length of the fifth lens;
R9 denotes a curvature radius of the object-side surface of the fifth lens;
R10 denotes a curvature radius of the image-side surface of the fifth lens; and
TTL denotes a total optical length from the object-side surface of the first lens to an image surface of the camera optical lens along an optical axis.

8. The camera optical lens according to claim 1 further satisfies following conditions:

$-11.68 \leq (R11+R12)/(R11-R12) \leq -1.04$; and $0.02 \leq d11/TTL \leq 0.13$;

where
R11 denotes a curvature radius of the object-side surface of the sixth lens
R12 denotes a curvature radius of the image-side surface of the sixth lens;
d11 denotes an on-axis thickness of the sixth lens; and
TTL denotes a total optical length from the object-side surface of the first lens to an image surface of the camera optical lens along an optical axis.

9. The camera optical lens according to claim 1 further satisfies following conditions:

$-1.45 \leq f7/f \leq -0.41$;

$-1.18 \leq (R13+R14)/(R13-R14) \leq -0.02$; and $0.04 \leq d13/TTL \leq 0.15$;

where
f7 denotes a focal length of the seventh lens;
d13 denotes an on-axis thickness of the seventh lens; and
TTL denotes a total optical length from the object-side surface of the first lens to an image surface of the camera optical lens along an optical axis.

10. The camera optical lens according to claim 1, wherein a combined focal length of the first lens and of the second lens is defined as f12, and the camera optical lens further satisfies a condition of $0.60 \leq f12/f \leq 2.06$.

* * * * *